E. S. R. BRANDT.
TORPEDO.
APPLICATION FILED MAR. 26, 1921.
1,394,271.
Patented Oct. 18, 1921.
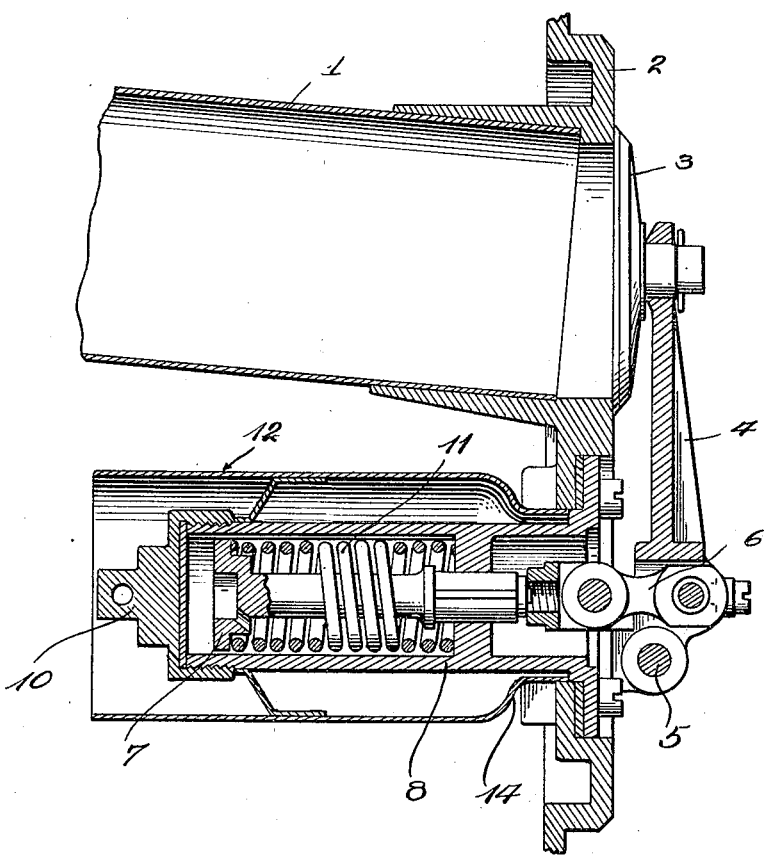
Inventor
E.S.R. Brandt
By
Attorney

UNITED STATES PATENT OFFICE.

EDMUND S. R. BRANDT, OF NEWPORT, RHODE ISLAND.

TORPEDO.

1,394,271.　　　　Specification of Letters Patent.　　Patented Oct. 18, 1921.

Application filed March 26, 1921. Serial No. 456,009.

*To all whom it may concern:*

Be it known that I, EDMUND S. R. BRANDT, a citizen of the United States, residing at Newport, Rhode Island, have invented new and useful Improvements in Torpedoes, of which the following is a specification.

This invention relates to improvements in torpedoes and more particularly to an attachment associated with the exhaust valve whereby the operation of this valve becomes more reliable and efficient in use.

By way of explanation it might be stated that the exhaust gases from a torpedo pass through longitudinally disposed pipes in the after-body and exhaust into the water near the propellers at the tail. These exhaust pipes are closed by an automatically operating valve for the purpose of preventing the ingress of water, if for any reason the source of power of the torpedo stops its operation. The valve is usually spring controlled but by reason of the heat radiated from the exhaust pipe the elasticity of the spring becomes more or less annealed or weakened thereby losing its elasticity and preventing a proper closing of the valve.

One of the objects of the present invention is, therefore, to provide a simple and practical attachment adapted to be associated with the valve mechanism whereby the life of the spring is greatly increased by reason of the fact that the heat radiated from the exhaust pipe is absorbed by an adjacent member and deflected therefrom into the surrounding atmosphere.

A further object is to provide a deflector of the above general character which may be inexpensively manufactured and installed in the mechanism now in general use without material modification or alteration of the parts or increasing materially the weight of the torpedo.

Other objects will be in part obvious and in part hereinafter pointed out in connection with the accompanying sheets of drawings forming part of this disclosure wherein is shown in longitudinal section one of the exhaust pipes and the associated valve and operating mechanism.

Referring to this drawing in detail, 1, denotes the usual exhaust pipe terminating at a member 2 in the tail of the torpedo, which member forms a valve seat for the disk valve 3 carried on the end of the arm 4 pivoted at 5 and actuated by means of intervening link mechanism 6. This link mechanism is connected to a plunger 7 operating within a cylindrical casing or cylinder 8 and closed at its end by nut 10. Interposed between the plunger or piston head 7 and the base of the chamber constituting the cylinder 8 is a spiral coiled spring 11 normally urging the piston head 7 toward the left thereby keeping the valve 3 closed under normal conditions. The pressure of the exhaust gases, however, are sufficient to overcome the tension of this spring and allow the gases to escape.

Heretofore this cylinder 8 being so closely adjacent the gas pipe absorbed a great deal of heat radiated therefrom and in time so seriously weakend the elasticity of the spring 11 that it was necessary to replace the same in order to insure a proper closing of the valve.

In order to overcome this difficulty, a shield 12 of general cylindrical shape is positioned about the cylinder 8 and provided on its interior with a plurality of clips 13 adapted to be engaged by the nut 10 thereby to force the reduced flanged end 14 into engagement with the supporting end wall of the after-body.

It will thus be seen that the intense heat radiated from the exhaust pipe will be absorbed by this deflector 12 and distributed thereby materially reducing the heat transmitted eventually to the spring 11.

The invention is of simple and practical construction and may be inexpensively manufactured, assembled and installed.

Without further analysis, the foregoing will so fully reveal the gist of this invention that others can by applying current knowledge readily adapt it for various applications without omitting certain features, that, from the standpoint of the prior art, fairly constitute essential characteristics of the generic or specific aspects of this invention, and, therefore, such adaptations should and are intended to be comprehended within the meaning and range of equivalency of the following claim.

What I claim is:—

In a torpedo, in combination, an exhaust pipe, a valve normally closing said pipe, a spring actuated piston connected with said valve to normally maintain the same in closed position, a cylinder surrounding said spring and piston, means inclosing said cylinder for absorbing the heat radiated from the exhaust pipe, said means being supported adjacent the end wall of the afterbody at one end and clips interposed between the cylinder and the said means near the opposite end.

Signed at Newport, Rhode Island, this 15th day of February, 1921.

E. S. R. BRANDT.